United States Patent
Dong

(10) Patent No.: US 9,748,827 B2
(45) Date of Patent: Aug. 29, 2017

(54) LINEAR VIBRATION MOTOR

(71) Applicant: Leping Dong, Shenzhen (CN)

(72) Inventor: Leping Dong, Shenzhen (CN)

(73) Assignee: AAC TECHNOLOGIES PTE. LTD., Singapore (SG)

( * ) Notice: Subject to any disclaimer, the term of this patent is extended or adjusted under 35 U.S.C. 154(b) by 351 days.

(21) Appl. No.: 14/583,732

(22) Filed: Dec. 28, 2014

(65) Prior Publication Data

US 2016/0013710 A1    Jan. 14, 2016

(30) Foreign Application Priority Data

Jul. 9, 2014 (CN) .................... 2014 2 0377756 U

(51) Int. Cl.
*H02K 33/00* (2006.01)
*H02K 33/16* (2006.01)

(52) U.S. Cl.
CPC .................... *H02K 33/16* (2013.01)

(58) Field of Classification Search
None
See application file for complete search history.

(56) References Cited

U.S. PATENT DOCUMENTS

| | | | | |
|---|---|---|---|---|
| 3,816,778 A * | 6/1974 | Frey | ...................... | F16F 15/085 310/25 |
| 7,911,098 B2 * | 3/2011 | Lee | ...................... | H02K 33/16 310/20 |
| 8,288,898 B2 * | 10/2012 | Jun | ...................... | H02K 33/16 310/13 |
| 8,624,450 B2 * | 1/2014 | Dong | ...................... | H02K 33/16 310/15 |
| 8,829,741 B2 * | 9/2014 | Park | ...................... | B06B 1/045 310/25 |
| 8,878,401 B2 * | 11/2014 | Lee | ...................... | B06B 1/045 310/15 |
| 2003/0227225 A1 * | 12/2003 | Kaneda | ................... | B06B 1/045 310/81 |
| 2009/0096299 A1 * | 4/2009 | Ota | ....................... | B06B 1/045 310/25 |
| 2010/0213773 A1 * | 8/2010 | Dong | ...................... | H02K 33/16 310/25 |
| 2011/0018364 A1 * | 1/2011 | Kim | ....................... | H02K 33/18 310/17 |
| 2011/0018365 A1 * | 1/2011 | Kim | ....................... | B06B 1/045 310/17 |

(Continued)

*Primary Examiner* — Naishadh Desai
(74) *Attorney, Agent, or Firm* — Na Xu; IPro, PLLC

(57) ABSTRACT

A linear vibration motor is disclosed in the present disclosure. The linear vibration motor includes a housing including a cover and a base associated with the cover to form an internal space; a pair of elastic members received in the internal space, each of the elastic member including a first connecting portion and an elastic arm extending from the first connecting portion and connected with the cover; an vibrator unit suspended in the internal space by the elastic members; a stator unit mounted on the base; a pair of dampers, each damper located on one side of the first connecting portion, and been in contact with the first connecting portion for absorbing vibrations of the vibrator unit; and a pair of clamping members, each clamping member clamping the first connecting portion and the damper to the vibrator unit.

12 Claims, 4 Drawing Sheets

(56) References Cited

U.S. PATENT DOCUMENTS

| | | | | |
|---|---|---|---|---|
| 2011/0018367 A1* | 1/2011 | Kim | ........................ | B06B 1/045 |
| | | | | 310/25 |
| 2011/0089772 A1* | 4/2011 | Dong | ..................... | H02K 33/16 |
| | | | | 310/25 |
| 2011/0101797 A1* | 5/2011 | Lee | ........................ | H02K 33/16 |
| | | | | 310/29 |
| 2011/0115310 A1* | 5/2011 | Dong | ..................... | H02K 33/16 |
| | | | | 310/28 |
| 2011/0115311 A1* | 5/2011 | Dong | ..................... | H02K 33/16 |
| | | | | 310/28 |
| 2011/0280433 A1* | 11/2011 | Park | ....................... | H02K 33/16 |
| | | | | 381/433 |
| 2011/0316361 A1* | 12/2011 | Park | ....................... | H02K 33/16 |
| | | | | 310/25 |
| 2012/0169148 A1* | 7/2012 | Kim | ....................... | H02K 33/18 |
| | | | | 310/25 |

\* cited by examiner

LINEAR VIBRATION MOTOR

FIELD OF THE INVENTION

The present invention relates to vibration motors, and more specifically to a vibration motor designed to be mounted on a portable devices to generate tactile vibration.

DESCRIPTION OF RELATED ART

In general, one of the key functions requisite for communication devices is a call reception function. Commonly used call reception functions include a sound generating function that generates a melody or a bell sound and a vibration function that transfers vibrations to a device.

Among the functions, the vibration function is commonly used so as not to interfere with others by preventing a melody or a bell sound from being transferred to the exterior through a speaker.

In order to implement such a vibration function, in general, a small vibration motor is driven to transfer driving force to a case of a device to make the device vibrate. The vibration motor related to the present art generally comprises a housing with a receiving space, a plurality of elastic members received in the receiving space and connected with the housing, a vibrator suspended in the receiving space by the elastic members, and a stator fixed on the housing and facing the vibrator. Wherein, each of the elastic members is connected with the vibrator by welding. In such case, the vibration damping is too low and thus the value of the quality factor of the vibration motor is too high, which can cause the vibration motor unstable performance during use.

Therefore, it is desirable to provide a new linear vibration motor for solving the problems mentioned above.

BRIEF DESCRIPTION OF THE DRAWINGS

Many aspects of the embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION OF THE EXEMPLARY EMBODIMENT

Reference will now be made to describe the exemplary embodiment of the present invention in detail.

Figure 1:
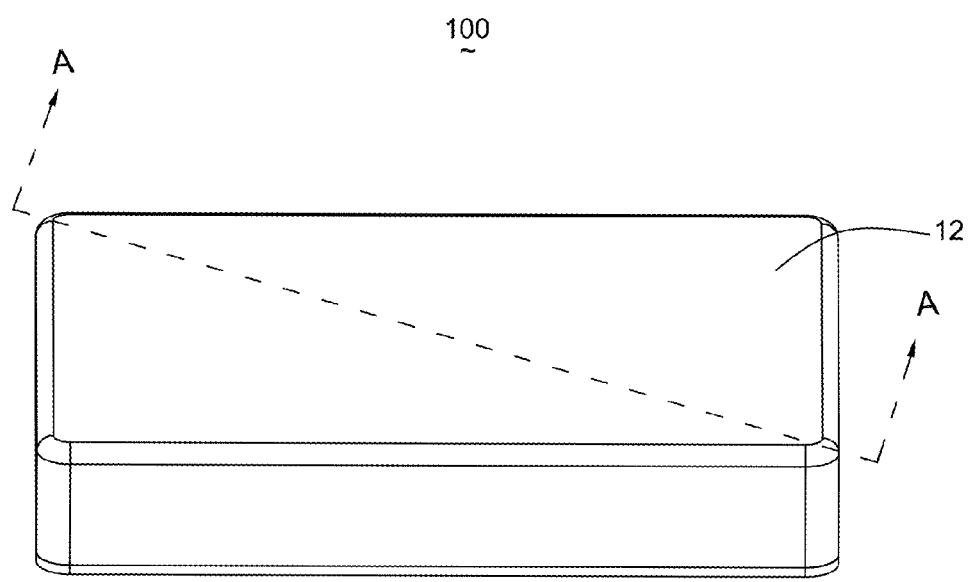
FIG. 1 is an illustrative isometric view of a linear vibration motor according to the present disclosure.
Figure 2:
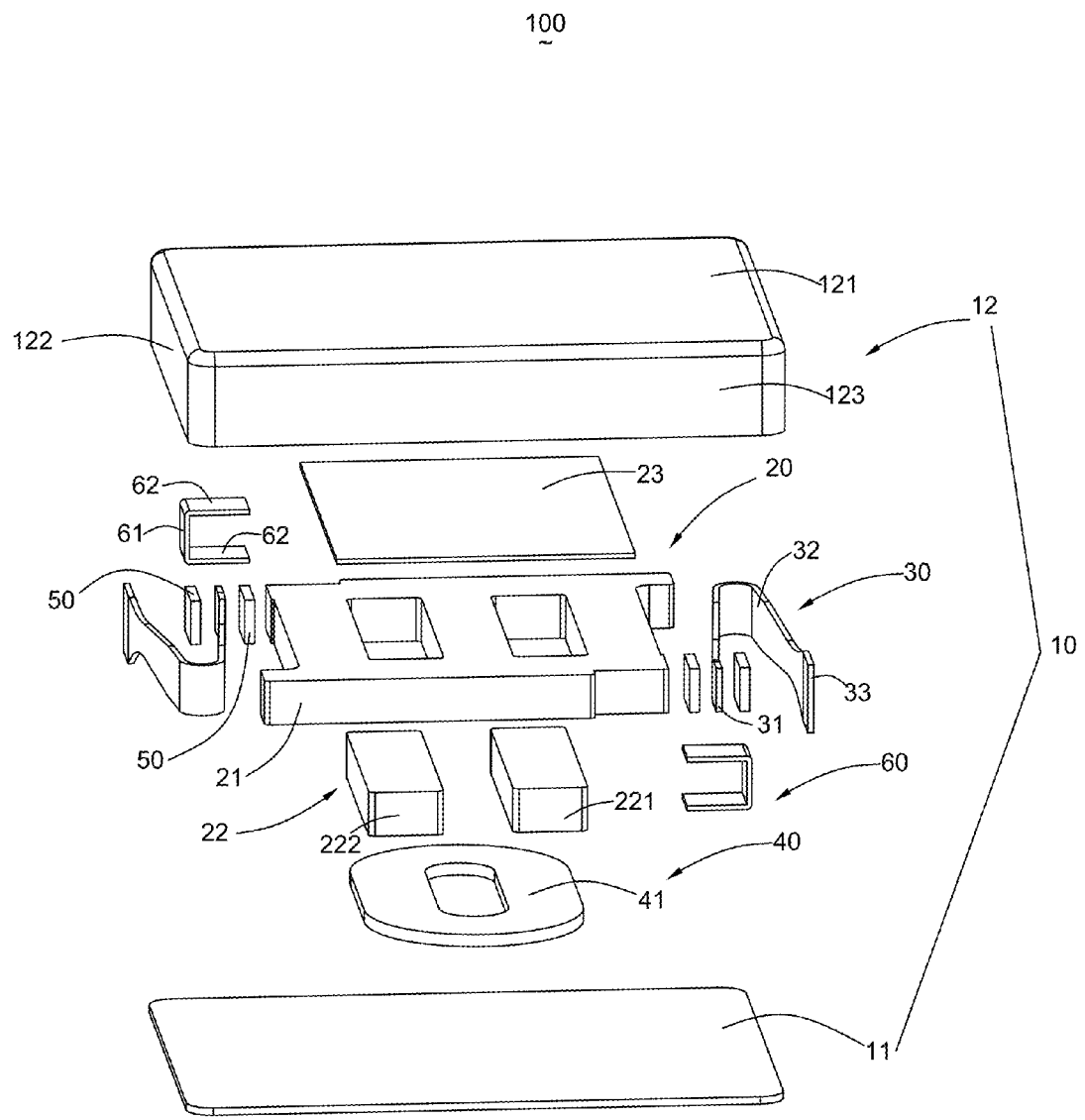
FIG. 2 is an exploded view of the linear vibration motor shown in FIG. 1.
Figure 3:
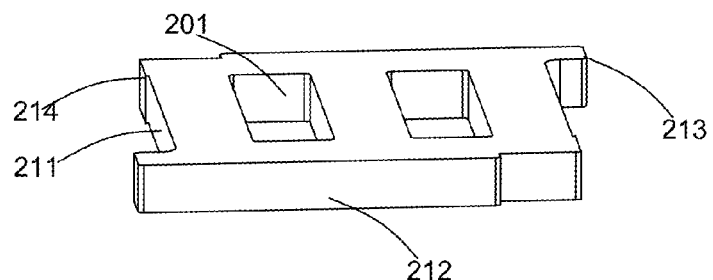
FIG. 3 is an illustrative isometric view of a weight of the linear vibration motor shown in FIG. 2.
Figure 4:
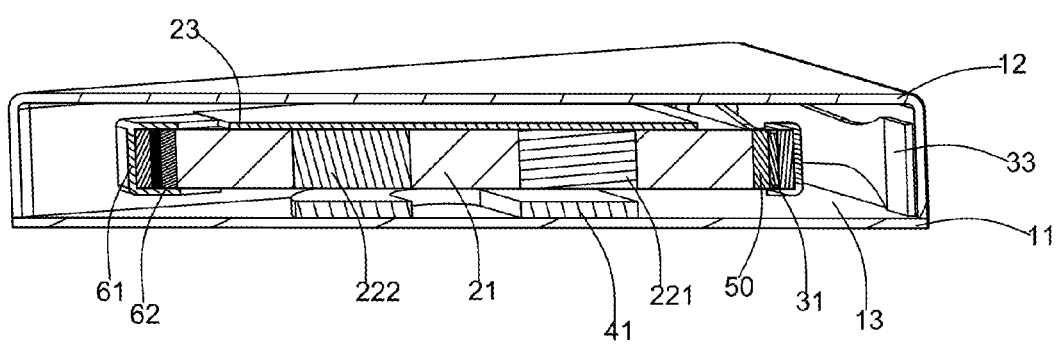
FIG. 4 is a cross-sectional view of the linear vibration motor taken along line A-A of FIG. 1.
Figure 5:
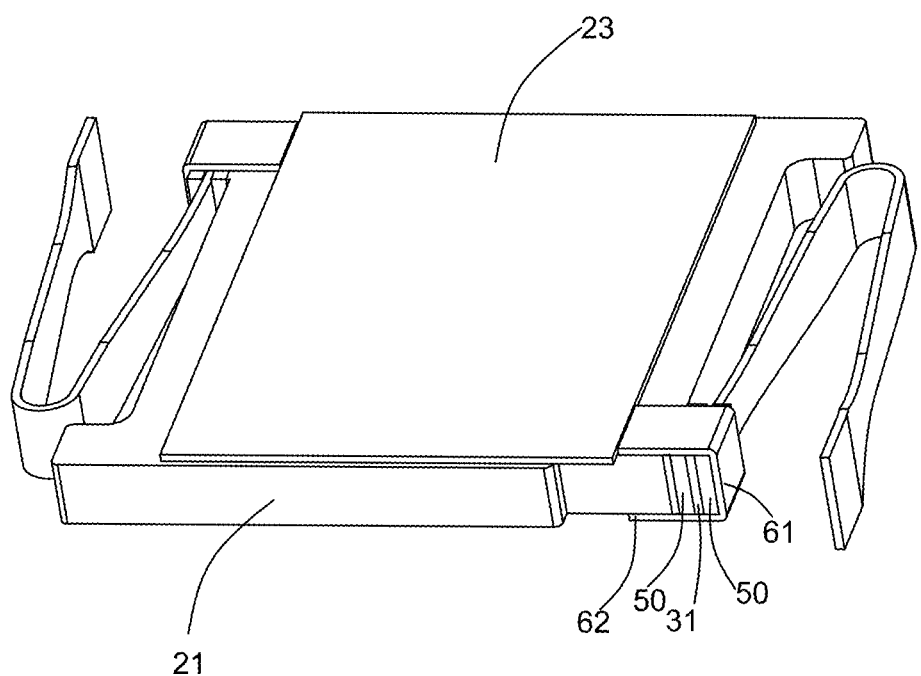
FIG. 5 is an assembled view of a combination of a vibrator unit, dampers and elastic members of the linear vibration motor shown in FIG. 2.

With reference to FIG. 1 through FIG. 5, a linear vibration motor 100 according to an exemplary embodiment of the present disclosure comprises a housing 10, a plurality of elastic members 30 received in the housing 10, a vibrator unit 20 suspended in the housing by the elastic members 30, a stator unit 40 fixed on the housing 10 and keeping a distance from the vibrator unit 20, at least one pair of dampers 50 adjacent to ends of the elastic members 30 and been in contact with the ends of the elastic members 30, and clamping members 60 clamping the ends of the elastic members 30 and the dampers 50 to the vibrator unit 20 for fixing the elastic members 30 and the dampers 50 to the vibrator unit 20.

The housing 10 comprises a base 11 and a cover 12 assembled with the base 11 to form an inner space 13. The housing 10 may be, but not limited to, rectangular cuboid shape. The cover 12 includes a top wall 121, a pair of widthwise sidewalls 122 extending downwardly from the top wall 121 in a widthwise direction of the housing 10 and opposite to each other, and a pair of lengthwise sidewalls 123 extending downwardly from the top wall 121 in a lengthwise direction of the housing 10. Bottom surfaces of the widthwise sidewalls 122 and lengthwise sidewalls 123 are attached on the base 11 by gluing, soldering, threaded connection, or the like.

The vibrator unit 20 comprises a weight 21, a magnet assembly 22 received in the weight 21, and a pole plate 23 attached on an upper surface of the magnet assembly 22.

The weight 21 may be but not limited to rectangular cuboid shaped. The weight 21 has two apertures 201 formed in a central thereof and spaced from each other for accommodating the magnet assembly 22. The number of the apertures 201 is not limited to this as long as it can accommodate the magnet assembly, and it can be set appropriately according to the number of magnet. The weight 21 is arranged parallel to the base 11. The weight 21 includes a pair of wide sides 211 opposite to each other, a pair of long sides 212 opposite to each other, and a pair of protruding parts 213 protruding from the respective ones of the wide sides 211 and perpendicularly to the corresponding wide side 211. The protruding parts 213 are arranged in diagonal corners of the weight 21. The weight 21 further comprises a pair of position portions 214 located in respective ones of the wide sides 211 and offset from corresponding protruding part 213 for connecting with the elastic members 30 and the damper 50.

The magnet assembly 22 includes a first magnet 221 and a second magnet 222. The first and second magnets 221, 222 are positioned in the two apertures 201 respectively. The first magnet 221 has a first pole, and the second magnet 222 has a second pole. The polarities of the first and second poles are traversed to each other. Alternatively, the magnet assembly 22 may include one magnet, which has two parts with two poles, the polarities of which are traversed to each other.

The stator unit 40 includes a coil 41 fixed on the base 11 and facing the first and second magnets 221, 222 with a space therebetween, and a print circuit board (not shown) electrically connected with the coil 41. The print circuit board may be formed separately from the base 11 or integrally formed according to a designer's intention. The vibrator unit 20 vibrates linearly by an interaction of the magnet assembly 22 and the coil 41 while the coil 41 is electrified.

Alternatively, the coil 41 may be installed into the weight 21, and the magnet assembly 22 can be fixed on the base 11, which also can interact with each other to generate force for driving the vibrator unit to vibrate.

The elastic member 30 includes a fastening portion 31 connected to the position portion 214 of the weight 21, and an elastic arm 32 extending obliquely from the fastening portion 31 and connected to the widthwise sidewall 122 of the cover 12. The elastic member 30 further includes a mounting portion 33 extending from a distal end of the elastic arm 32 for mounting on the widthwise sidewall 122 of the cover 12 by gluing, soldering, threaded connection, or the like. The fastening portion 31 may be a square shaped piece. The elastic arm 32 is made of metal material, and may be a curved spring sheet.

Four dampers 50 are provided in this embodiment for absorbing vibration of the vibrator unit 20. Each damper 50 may be but not limited to square piece shaped. Each damper 50 may be made of silica gel, rubber, foam, or the like. Each two dampers 50 are positioned on both sides of the fastening portion 31, adjacent to the fastening portion 31 and in contact with the fastening portion 31, namely the fastening portion 31 is sandwiched between each two dampers 50. The material, size, and shape of the damper 50 can be changed according to the real request. Note that, the value of vibration damping force of the linear vibration motor is positively correlated with a thickness of the damper and negatively correlated with the value of the young's modules of the damper. Alternatively, only two dampers 50 are provided. Each damper 50 is positioned on one side of the fastening portion 31 and is in contact with the corresponding fastening portion 31 of the elastic members 30 for absorbing the vibration of the vibrator unit 20, which also can increase the value of the vibration damping of the linear vibration motor, and thus reduce the quality factor of the linear vibration motor.

A pair of clamping members 60 is provided in this embodiment for clamping the fastening portion 31 and the dampers 50 to the position portion 214 of the weight 21. Each of the clamping members 60 takes U-like plate shape, and includes an engaging portion 61 and two swings 62 extending perpendicularly from the engaging portion 61 respectively.

When assembled, the engaging portion 61 presses the dampers 50 and the fastening portion 31 to the position portion 214 of the weight 21, and one swing 62 engages with upper ends of the dampers 50 and the fastening portion 31, another swing 62 engages with lower ends of the dampers 50 and the fastening portion 31 with distal ends thereof fixed to an upper surface and lower surface of the weight 21, respectively.

With the construction of the exemplary embodiment, the elastic member is connected to the vibrator unit indirectly by sandwiching a damper between the elastic member and the vibrator unit, which can increase the value of the vibration damping of the linear vibration motor and reduce the quality factor of the linear vibration motor, thus, the linear vibration motor can perform a stable performance during use.

It is to be understood, however, that even though numerous characteristics and advantages of the present disclosure have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A linear vibration motor comprising,
    a housing comprising a cover and a base associated with the cover for forming an internal space;
    a pair of elastic members received in the internal space, each of the elastic member comprising a fastening portion and an elastic arm extending from the fastening portion and connected with the cover;
    a vibrator unit suspended in the internal space by the elastic members and movable parallel to the base;
    a stator unit mounted on the base and facing the vibrator unit with a space therebetween;
    a pair of dampers, each damper located on one side of the fastening portion and been in contact with the fastening portion for absorbing vibrations of the vibrator unit;
    a pair of clamping members, each clamping member clamping the fastening portion and the damper to the vibrator unit wherein the engaging portion presses the fastening portion and the damper to the vibrator unit; one of the swings engages with upper ends of the fastening portion and the damper, and another swing engages with lower ends of the fastening portion and the damper with distal ends of the swings fixed to the vibrator unit.

2. The linear vibration motor of claim 1, wherein the clamping member comprises an engaging portion and a pair of swings extending perpendicularly from the engaging portion for clamping the fastening portion and the damper to the vibrator unit.

3. The linear vibration motor of claim 1 further comprising two pairs of dampers, each two dampers disposed on both sides of the fastening portion; wherein the dampers and the fastening portion are sandwiched between the engaging portion and the vibrator unit.

4. The linear vibration motor of claim 1, wherein the vibrator unit comprises a magnet assembly and a weight suspending in the housing by the elastic members and having apertures in a central portion thereof for receiving the magnet assembly.

5. The linear vibration motor of claim 4, wherein the magnet assembly includes a first magnet and a second magnet separately positioned in the apertures of the weight.

6. The linear vibration motor of claim 5, wherein the first magnet has a first pole and the second magnet has a second pole;
    polarities of the first and second poles are traversed to each other.

7. The linear vibration motor of claim 6, wherein the stator unit comprises a coil fixed on the base and facing the magnet assembly with a space therebetween.

8. A linear vibration motor comprising,
    a bracket;
    a cover forming a receiving space together with the bracket;
    a plurality of spring bodies received in the receiving space, each spring body comprises a mounting portion connected to the cover, a fastening portion and a spring strip extending from the mounting portion to the fastening portion;
    a mass body elastically supported by the spring bodies for being suspended in the receiving space;
    a magnetic field unit comprising a magnet assembly received in the mass body and a coil mounted on the bracket and facing the magnet assembly with space;
    a plurality of cushion members, each two cushion members arranged in contact with the fastening portion and sandwiching the fastening portion;
    a plurality of clamping members each corresponding to one of the spring bodies, each clamping member clamping the cushion members and the fastening portion to the mass body wherein the engaging portion presses the fastening portion and the cushion member to the mass body; one of the swings engages with upper ends of the fastening portion and the cushion members, and another swing engages with lower ends of the fastening portion and the cushion members with distal ends of the swings fixed to the mass body.

9. The linear vibration motor of claim 8, wherein the clamping member comprises an engaging portion and a pair of swings extending perpendicularly from the engaging portion for clamping the fastening portion and the damper to the mass body.

10. The linear vibration motor of claim 9, wherein the mass body has two apertures spaced from each other in a central portion thereof for receiving the magnet assembly.

11. The linear vibration motor of claim 10, wherein the magnet assembly includes a first magnet and a second magnet separately positioned in the apertures respectively.

12. The linear vibration motor of claim 11, wherein the first magnet has a first pole and the second magnet has a second pole;

polarities of the first and second poles are traversed to each other.

* * * * *